Feb. 16, 1932.  F. P. MILLER  1,845,055
FLUSH VALVE
Filed March 28, 1927
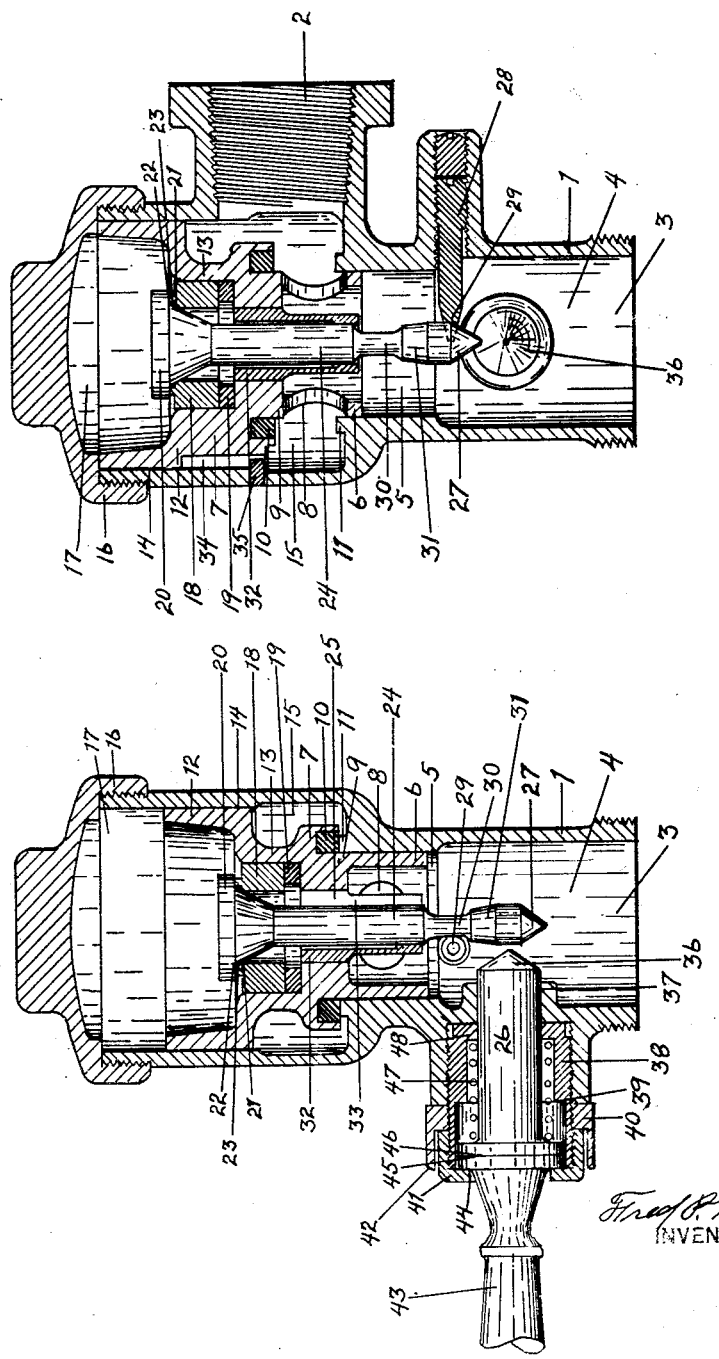
Fred P. Miller.
INVENTOR Patented Feb. 16, 1932

1,845,055

UNITED STATES PATENT OFFICE

FRED P. MILLER, OF SAN FRANCISCO, CALIFORNIA

FLUSH VALVE

Application filed March 28, 1927. Serial No. 179,065.

This invention relates to a flush valve adapted to be used in connection with water closets and the like.

It is a general object of the invention to provide a flush valve which is positive in operation and simple in construction. The present application is a continuation in part of my copending application filed January 12, 1927, Serial No. 160,643.

It is a well appreciated fact in connection with flush valves that the small hole known as the "by pass" becomes clogged with foreign matter, or becomes enlarged. This results in the timing of the valve being destroyed. To overcome this it is necessary to either clean out or replace the "by pass" with a new one. The flush valve of the present invention is free from this trouble.

A further object of this invention is to provide for the natural wear which occurs on the piston and cylinder wall and which interferes with the operation of a valve of this type. This is accomplished in a simple manner without the necessity of replacing any new parts for a considerable period of time except when it is desirable to replace the rubber ring of the main valve seat.

In the present invention one object is to provide means which enable the speed of the piston to be regulated after the cylinder wall has become worn.

A still further object of my invention is the construction of a resilient metallic relief valve of simple design.

The invention possesses other advantageous features and objects, some of which with the foregoing will be set forth at length in the following description where I shall outline in full that form of flush valve of my invention, which I have selected for illustration in the drawings accompanying and forming part of the present specification. In said drawings I have shown one form of flush valve embodying my invention, but it is to be understood that I do not limit myself to such form since the invention, as set forth in the claims, may be embodied in a plurality of forms.

Figure 1 is a vertical section through a form of valve with the parts in inactive position.

Figure 2 is a sectional view at 90° to that shown in Figure 1 with the parts in active position.

The form of flush valve shown in the drawings includes a casing 1 having an inlet portion 2 suitably threaded to fit a standard pipe connection. An outlet portion 3 is also formed on the casing and is suitably threaded to connect with a pipe or tubing leading to the vessel to which the flow is to be controlled. An intermediate chamber 4 connects the outlet 3 with a valve outlet 5 which is finished to fit a valve guide 6. This valve guide is formed as a part of a main valve support 7 and concentric therewith so that the valve support 7 is in alignment with the valve outlet 5.

The valve guide 6 is formed with ports 8 through which fluid pases into the valve outlet 5 when the valve is open. A pilot 9 is formed to fit the valve outlet 5 and is part of the valve guide 6; its purpose is to enter the valve outlet just before a valve ring 10 comes to rest on seat 11, thus preventing the flow of fluid from stopping too suddenly. The valve ring is formed of rubber or other suitable material and is held in a groove which is part of the valve support 7. The valve seat is formed as a part of the casing 1 and is so arranged that it comes in contact with the main valve 10 to prevent fluid from communicating with the outlet 3 and inlet 2 when the valve ring is seated.

The valve support 7 is joined with a piston 12 through sleeve 13. The piston 12 is of such diameter that a by pass 14 is provided about the piston. An inlet chamber 15 is formed by the sleeve 13 and the cylinder from which the sleeve is spaced. This chamber connects the inlet opening 2 with the valve outlet 5 when the valve is in open position.

A head 16 is threaded onto the casing 1 at its upper end to provide a fluid tight seal therefor. The space within the head 16, casing 1, and piston 12 is termed control chamber 17. This chamber is filled with fluid through the by pass 14 when the flush valve is in operative position.

The piston 12 is adapted to receive an annular relief valve seat 18, the seat being formed of suitable material to form a fluid tight seal. The relief valve seat 18 rests upon the rubber washer 19. This positions the seat in alignment with a relief valve 20 to secure a tight joint and to eliminate accurate machining of that part of the piston.

The relief valve seat 18 is formed with an angled face 21 and straight face 22 and has a conical shaped portion which seats against angle face 21. The valve is constructed with these parts of such a size that the valve 20 does not seat on the straight face 22. However, as the valve 20 wears in it eventually seats on the straight face 22. The straight face 22 is provided on the relief valve seat 18 for two reasons; one is to act as a heel for the purpose of lifting valve 20 up off its seat when the valve is tilted; the other is to prevent all of the wear from taking place on angled face 21. The angled face 21 of the valve seat 18 also has two objects; one is to guide the valve 20 to its seat; the other is to control the escape of the surplus fluid when it is desired to slow down the movement of the piston 12. The space wherein the fluid escapes, when it is so desired, is termed exhaust by pass 23.

The relief valve 20 is formed with a stem 29 which extends down through a passage 25 to a cam 27. The cam 27 is adapted to engage a reciprocable plunger 26. An adjustment screw 28 is secured in a boss mounted on casing 1 and is formed with an angled point 29 which is set to engage with the stem 24 when the flush valve is open to hold the stem 24 in a tilted position. When in this position the by pass 23 is opened, allowing a desired amount of fluid to escape into the passage 25 from the chamber 17. The stem is formed with a groove or recess 30 and is so disposed with respect to the screw 28 that this screw is disengaged from the stem 24 when the valve is in a closed position as is shown in Figure 1. The stem 24 is also formed with an angled or conical portion 31 which allows the stem to approach gradually its closing position at a point before the flush valve really closes. This is done to offset the back pressure created in chamber 17 due to the closing of the relief valve.

A sleeve 32 is held in the passage 25 to prevent the direct discharge of fluid from striking against stem 24 and to hold the valve stem 24 rigidly. The sleeve 32 is formed with a slot 33 so that the stem may move laterally when the plunger 26 engages it. The sleeve 32 also supports the stem 24 only at its lowest point while the ports 8 are so spaced that fluid is deflected away from the slot 33 formed in the sleeve 32 when the flush valve is open.

A slot or groove 34 is formed in the piston 12 to engage with a pin 35 which is held in the casing 1. The pin 35 prevents the piston 12 from turning, thereby ensuring that the slot in the sleeve 32 does not get out of alignment with stem 24.

The plunger 26 is also formed with an angled face 36 which may be engaged with the cam 27. This plunger is adjustably supported and communicates with the relief valve stem 24 through a passage 37 which is drilled through the wall of intermediate chamber 4. The plunger 26 is slidably supported at its outer end by a cylindrical member 38. The cylindrical member 38 is formed with a shoulder or stop 39 against which plunger 26 abuts when it has entered the desired distance into the intermediate chamber 4. The member 38 is also supported by a housing which is part of the main casing. This housing is manufactured with an internal thread into which the cylindrical member 38 is screwed to a depth depending upon the desired operative position of the plunger.

A locknut 40 is threadedly mounted on the cylindrical member 38 and normally jams against a surface of the housing to lock the cylindrical member 38 in place. A cap 41 is formed with an internal thread and screws over the outer end of the cylindrical member 38 to form a chamber 42 of fixed size and, also, to act as a backing for an operating handle 43.

The cap 41 is formed with an opening 44 at its outer end through which the operating handle 43 passes. Since the plunger is allowed to slide in the chamber 43, it will be noted that, when handle 43 tilts in any direction, the face 45 of the handle tilts at an angle, thereby pressing against face 46 of plunger 26 to cause it to move forward. Plunger 26 and operating handle 43 are held in their inoperative position by a spring 47 which presses against a surface of the plunger 26. It will be noted that spring 47 has a constant uniform tension, because adjustment of the plunger does not change the amount of space between the points where spring 47 presses against plunger 26 and where it presses against the cylindrical member 38. It is for this reason that cylindrical member 38 is formed with a flange 48.

The operation of the preferred form of valve is as follows:

Normally the parts are in a position shown in Figure 1. The fluid under pressure in inlet chamber 15, which is directly connected to the main supply of fluid through inlet opening 2, is free to communicate with the control chamber 17 through by pass 14 which lies between piston 12 and the cylinder wall. There is a downward pressure, therefore, over the entire upper surface of piston 12, while the upward pressure on the under side of piston 12 covers only the annular surface lying outside of the valve 10. The difference in pressure holds the ring valve 10 firmly down on its seat 11 to prevent any flow of fluid. When the operative handle 43 is depressed, the relief valve 20 is tilted. Just as soon as the relief valve is opened, a portion of the fluid in control chamber 17 is discharged into passage 25. This relieves the pressure from the upper surface of piston 12 so that the piston is raised by the pressure underneath. This raises the valve 10 off its seat 11 and opens the ports 8 to allow fluid to pass from the inlet chamber 15 into the valve outlet 5 and thence to the outlet 3.

The height that the main valve 10 rises off its seat 11 is governed by the amount that the plunger projects into the intermediate chamber 4. When the valve 10 is raised the cam 27 rests against the plunger cam 36 and slides along the surface of the cam. The surfaces on the cam 27 and plunger cam 36 are such that as the piston 12 rises the cam 27 travels upward and, as these surfaces are reclining, the stem cam 27 approaches its normal position. This closes the relief valve 20 even though plunger 26 is still in operative position, and main valve 10 opens to a proportionate height. The pressure across the head of the relief valve 20 presses the cam surfaces together. As soon as relief valve 20 closes the piston 12 comes to a standstill. The operating handle 43 by this time is normally released, allowing the plunger to recede to its normal positon.

The control chamber 17 is now receiving fluid through by pass 14 and, as this fluid flows into control chamber 17, the piston 12 is caused to move downward until the valve 10 rests on seat 11 again. As the piston 12 approaches the end of its closing position, pilot 9 enters the valve outlet 5 to cut down the velocity of fluid so that when valve 10 engages seat 11 there will not be a knock or hammer in the supply pipe caused by too sudden stoppage of fluid.

It may be well to point out at this time a feature which adds to the life of the flush valve. When the valve is new the piston 12 fits fairly close to the casing 1 so that if piston 12 was allowed to rise the full amount of its normal stroke, the valve would take too long to close. It is therefore adjusted to rise to a height which will produce a satisfactory flush and no more. It will be seen that the shorter the stroke the quicker will be the reseating of valve 10. Although ports 8 may, in the above case, be partially open, nevertheless the increased velocity of the fluid compensates for this.

As the valve is used and the piston 12 and the casing 1 become worn, the piston 12 closes sooner due to the increased area of by pass 14. An adjustment of the plunger, however, causes the piston to rise higher and to pass into that portion of casing 1 which has not been worn, thus enabling a satisfactory flush to be secured again.

When this process of adjustment has been carried to a point where piston 12 requires its full stroke and the casing has worn over its entire length, the adjustment screw 28 is so adjusted that it engages with the stem 24 when the valve is open. It will be seen that when the plunger has completed its tilting of the relief valve 20 and is allowed to return to its normal position, the relief valve stem 24 will rest against adjustment screw 28, thus creating the by pass 23 through which a portion of fluid is allowed to escape, the amount of escapage desired being determined by the amount that the by pass 14 has worn.

The angled seat 21 of relief valve 20 reduces the ratio of opening or closing of the by pass 23 in relation to the position of adjustment screw 28, otherwise the slightest turn of adjustment screw 28 would cause too great a discharge through the by pass 23. A further advantage of having an angle seat instead of only a straight or flat seat, is that the angle seat breaks some of the velocity of fluid. In this connection it is to be noted that the velocity of fluid in the by pass 23 is a deal higher than in the by pass 14 due to less friction. Therefore, as valve 10 approaches the seat 11, a back pressure is built up in the chamber 15, creating a higher pressure in control chamber 17 and increasing the discharge flow through by pass 23 in excessive proportion to that in by pass 14. To offset this condition, stem 24 is formed with an angled surface 31, which allows the by pass 23 to get smaller as the back pressure gets higher in the control chamber 17. The adjustment screw 28 finally engages with the groove 30 to allow the relief valve to close entirely. With this process of adjustment, the life of the flush valve is greatly extended. Furthermore, the by pass 23 cannot become clogged due to the fact that the by pass is opened wide during each flush.

It is understood that I do not limit myself to the above means of regulating the speed or travel of the piston. The relief valve may have various other forms to secure a sensitive adjustment or the breaking of the velocity of fluid through the by pass. Also the surplus fluid may be allowed to escape by means other than through the relief valve.

What I claim is:

1. In a fluid operated valve, a casing, a valve member movable by fluid pressure from open to closed positions, secondary valve means functioning to control said fluid pressure, said secondary valve means when open causing fluid pressure to move the valve member to open position, and when closed functioning to cause fluid pressure to move the valve member to closed position, an adjustable member, and a member cooperatively associated with said secondary valve means and having a cam surface adapted to engage said adjustable member, said cam surface serving to cause gradual closing of said valve means before the valve member has moved to complete open position and serving to effect complete closing of the secondary valve means to arrest opening movement of the valve member.

2. In a flush valve, a casing formed with inlet and outlet openings, a primary valve member within said casing for controlling the passage of fluid between said openings, and means for controlling movement of the primary valve comprising a relief valve seat within said casing, a relief valve member engaging said relief valve seat, said relief valve member being formed with a stem having a conical portion angle thereon, and an adjustable stop engaging said conical portion for the purpose of further closing the relief valve member at a desired time.

3. In a flush valve, a casing formed with inlet and outlet openings, a valve member movable within said casing for controlling flow of fluid between said openings, said valve member having an opening, a valve seat adjacent to said opening, a valve engaging said seat, said valve being formed with a stem, an adjustable stop against which said stem presses thereby preventing said relief valve from seating, thus allowing a portion of the fluid to escape, and means for permitting disengagement of said stem from said adjustable stop, thereby causing said relief valve to close.

4. A flush valve comprising a casing formed with an inlet and an outlet opening, a piston slidable within said casing, said piston being formed with an opening, a valve seat adjacent to said opening, a valve member engaging said seat, said valve member being formed with a stem, means for varying the movement of said stem, a plunger adapted to engage with said stem so that when the piston travels a certain distance the plunger will be out of operative relation to said stem, and a fluid chamber for controlling the travel of said piston, one face of said piston forming one wall of said chamber.

5. A flush valve comprising a cylinder formed with an inlet and an outlet opening, a primary valve for controlling passage of fluid between said openings, a piston slidable within said cylinder having a portion of its cross section of suitable diameter to allow fluid to pass from one side of said piston to the other side thereof, thus forming a by-pass for fluid, said piston being formed with an opening, a valve seat adjacent to said opening, a valve member engaging said seat, said valve member being formed with a stem, a plunger adapted to engage the end of said stem, means provided for varying the stroke of said piston, and an adjustable stop against which said stem of the relief valve is adapted to press, thereby preventing said relief valve from seating and thus allowing a portion of the fluid to escape, and means for disengaging said stem from the adjustable stop thereby permitting closing of said relief valve.

6. In a flush valve, a casing having inlet and outlet openings, primary valve means for controlling flow thru said openings, said means including a member movable by fluid pressure and a pressure chamber having one of its walls defined by said member, a by-pass of substantial area communicating between said inlet and said chamber, another passage communicating between said chamber and said outlet, secondary valve means for effecting control of said last named passage whereby said member is moved to open said primary valve means when said secondary valve means is open and whereby said member is moved to closed position when said secondary valve means is partially or entirely closed, and means for retaining said secondary valve means in partially closed condition during closing movement of said member.

7. In a flush valve, a casing having inlet and outlet openings, a cylinder disposed within the casing, a piston having a leaky fit within the cylinder thereby forming a substantial by-pass between the cylinder and said inlet, a passage between said cylinder and said outlet, secondary valve means for controlling said passage, said piston being movable in one direction under fluid pressure when said secondary valve means is in open condition and movable under fluid pressure in the opposite direction when said secondary valve means is closed, primary valve means associated with said piston for controlling flow of fluid thru the casing, said primary valve means being closed as said piston is moved in said opposite direction, and means for retaining said secondary valve means in partially open condition during movement of said piston in said opposite direction, whereby closing movement of said primary valve means is retarded.

8. In a flush valve, a casing having inlet and outlet openings, primary valve means for controlling flow thru said openings, said means including a member movable by fluid pressure and a pressure chamber having one of its walls defined by said member, a by-pass of substantial area communicating between said inlet and said chamber, another passage communicating between said chamber and said outlet, secondary valve means for effecting control of said last named passage whereby said member is moved to open said primary valve means when said secondary valve means is open and whereby said member is moved to closed position when said secondary valve means is partially or entirely closed, and adjustable means for retaining said secondary valve means in partially closed condition during closing movement of said member.

9. In a flush valve, a casing having inlet and outlet openings, and fluid operated means located within the casing for effecting opening of the valve responsive to a manual operation and for effecting automatic closing, said means including a fluid cylinder, a piston fitted loosely within the cylinder whereby the space between the piston and the cylinder forms a by-pass communicating between the inlet and said cylinder, relief valve means carried by said piston, manually operated means for effecting opening of the relief valve whereby the piston is moved under fluid pressure to open the flush valve, and cam means for adjusting the point of closing of said relief valve with respect to the movement of the piston.

10. In a flush valve, a casing having inlet and outlet openings, and fluid operated means located within the casing for effecting opening of the valve responsive to a manual operation and for effecting subsequent automatic closing, said means including a cylinder, a piston fitted loosely within the cylinder whereby the space between the piston and the cylinder forms a by-pass communicating between the inlet and said cylinder, relief valve means for exhausting fluid from the cylinder to effect movement of the piston to open the valve, and means operating upon said relief valve for effecting both opening of the relief valve and for adjusting closing of the relief valve with respect to movement of the piston.

11. In a flush valve, a casing having inlet and outlet openings, and fluid operated means located within the casing for effecting opening of the valve responsive to a manual operation and for effecting subsequent automatic closing, said means including a cylinder, a piston fitted loosely within the cylinder whereby the space between the piston and the cylinder forms a by-pass communicating between the inlet and said cylinder, relief valve means for exhausting fluid from the cylinder to effect movement of the piston to open the valve, said relief valve means being carried by the piston, and means operating upon said relief valve for effecting both opening of the relief valve and for adjusting automatic closing of the relief valve with respect to movement of the piston.

12. In a flush valve, a casing having inlet and outlet openings, actuating means operable externally of the casing, and fluid operated means located within the casing for effecting opening of the valve responsive to an operation of said actuating means and for effecting subsequent automatic closing, said last named means including a cylinder, a piston fitted loosely within the cylinder whereby the space between the piston and the cylinder forms a by-pass communicating between the inlet and said cylinder, relief valve means for exhausting water from the cylinder to effect movement of the piston into the cylinder to open the valve, and means for exhausting a restricted quantity of water from the cylinder during subsequent recurrent movement of the piston.

In testimony that I claim the foregoing as my own, I have hereto affixed my signature.

FRED P. MILLER.